United States Patent
Yu et al.

(10) Patent No.: US 8,116,927 B2
(45) Date of Patent: Feb. 14, 2012

(54) DYNAMIC TRACTION CONTROL

(75) Inventors: Hai Yu, Canton, MI (US); Ming Lang Kuang, Canton, MI (US)

(73) Assignee: Ford Global Technologies, Dearborn, MI (US)

( * ) Notice: Subject to any disclaimer, the term of this patent is extended or adjusted under 35 U.S.C. 154(b) by 40 days.

(21) Appl. No.: 12/761,934

(22) Filed: Apr. 16, 2010

(65) Prior Publication Data

US 2011/0172863 A1    Jul. 14, 2011

(51) Int. Cl.
 *G06F 19/00* (2006.01)
 *B60W 10/08* (2006.01)
 *B60L 1/10* (2006.01)
(52) U.S. Cl. .................. 701/22; 180/65.285; 307/9.1
(58) Field of Classification Search ............ 701/22, 701/69; 180/65.21, 65.285, 65.29, 65.31; 307/9.1, 10.1, 10.7
See application file for complete search history.

(56) References Cited

U.S. PATENT DOCUMENTS

| | | | |
|---|---|---|---|
| 4,589,511 A * | 5/1986 | Leiber | 180/197 |
| 6,862,511 B1 * | 3/2005 | Phillips et al. | 701/54 |
| 7,248,957 B2 | 7/2007 | Billig | |
| 7,337,053 B2 | 2/2008 | Piyabongkarn et al. | |
| 7,491,145 B2 | 2/2009 | Mizon et al. | |
| 7,634,338 B2 | 12/2009 | Kaltenbach et al. | |
| 7,739,005 B1 * | 6/2010 | Tang | 701/22 |
| 7,742,852 B1 * | 6/2010 | Tang | 701/22 |
| 2008/0004780 A1 | 1/2008 | Watanabe et al. | |
| 2008/0059022 A1 | 3/2008 | Shimodaira et al. | |
| 2008/0288149 A1 | 11/2008 | Drenth | |
| 2009/0118950 A1 | 5/2009 | Heap et al. | |

OTHER PUBLICATIONS http://sciencelinks.jp/j-east/article/200304/000020030403A0071970.php, Science Links Japan, Improving Handling and Stability of Small-Scale Electric Vehicle "NOVEL" by Traction Torque Control, pp. 1.

* cited by examiner

*Primary Examiner* — Yonel Beaulieu
(74) *Attorney, Agent, or Firm* — Angela M. Brunetti; Fredrick Owens

(57) ABSTRACT

A vehicle in which propulsion can be distributed between first and second axles includes: a first electric motor coupled to the first axle and a second electric motor coupled to the second axle. An electric control unit (ECU) coupled to the motors causes electrical energy to be generated by the first motor in response to the ECU determining that a wheel speed of at least one wheel associated with the first axle exceeds the vehicle speed and causing electrical energy to be supplied to the second motor in response to electrical energy being generated in the first motor.

23 Claims, 2 Drawing Sheets

DYNAMIC TRACTION CONTROL

BACKGROUND

1. Technical Field

The present disclosure relates to vehicle control systems that enhance vehicle stability and performance.

2. Background Art

Stability-control systems are increasingly being used in automotive vehicles. In some prior two driven axle systems, a mechanical coupling is provided between the front and rear axles of the vehicle. In the event that one or both of the wheels associated with one of the driven axle lose traction, the coupling apparatus, which is normally uncoupled, is commanded to couple the two axles so that torque is redistributed between a primary axle and a secondary axle. Although such a mechanical system provides improved performance compared to a purely braking approach such as with anti-lock braking systems or traction control system, a mechanical system has several disadvantages. There is a delay between the time that the traction loss is detected and the mechanical coupler actually redistributes torque from the spinning wheels of the primary axle to the wheels of the secondary. In situations such as encountering a patch of ice, in which road surface conditions can change very rapidly, a mechanical system is incapable of effecting a change in torque distribution sufficiently fast. Furthermore, due to frictional losses through the mechanical coupler, the sum of the torques supplied to the two axles is somewhat less than what the powertrain supplies to the primary axle. Thus, when the mechanical coupler is invoked, there is a drop in longitudinal performance of the vehicle, which may be particularly noticeable during acceleration. The ability of a mechanical system to redistribute torque may be limited in torque transfer capacity and further hampered by environmental influences, such as temperature.

SUMMARY

A system to distribute propulsion in a vehicle has first and second axles coupled to the vehicle, a first motor coupled to the first axle, a second motor coupled to the second axle, wheel speed sensors coupled to vehicle wheels, a vehicle speed sensor, and an electronic control unit (ECU) electronically coupled to motors, the wheel speed sensors, and the vehicle speed sensor. The ECU causes electrical energy to be generated by the first motor and causes electrical energy to be supplied to the second motor in response to the ECU determining that at least one wheel associated with the first axle is spinning. The electrical energy generated by the first motor may be provided directly to the second motor and possibly supplemented by a battery coupled to the motors. The wheels sensors may be part of an anti-lock braking system.

A method to distribute propulsion in a vehicle includes monitoring wheel spin for wheels associated with a first axle of the vehicle, extracting electrical energy from a first motor coupled to the first axle when a first axle wheel is spinning, and providing electrical energy to a second motor coupled to a second axle of the vehicle in response to the extracting electrical energy from the first motor.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated and described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations consistent with the present disclosure, e.g., ones in which components are arranged in a slightly different order than shown in the embodiments in the Figures. Those of ordinary skill in the art will recognize that the teachings of the present disclosure may be applied to other applications or implementations.

Figure 1:
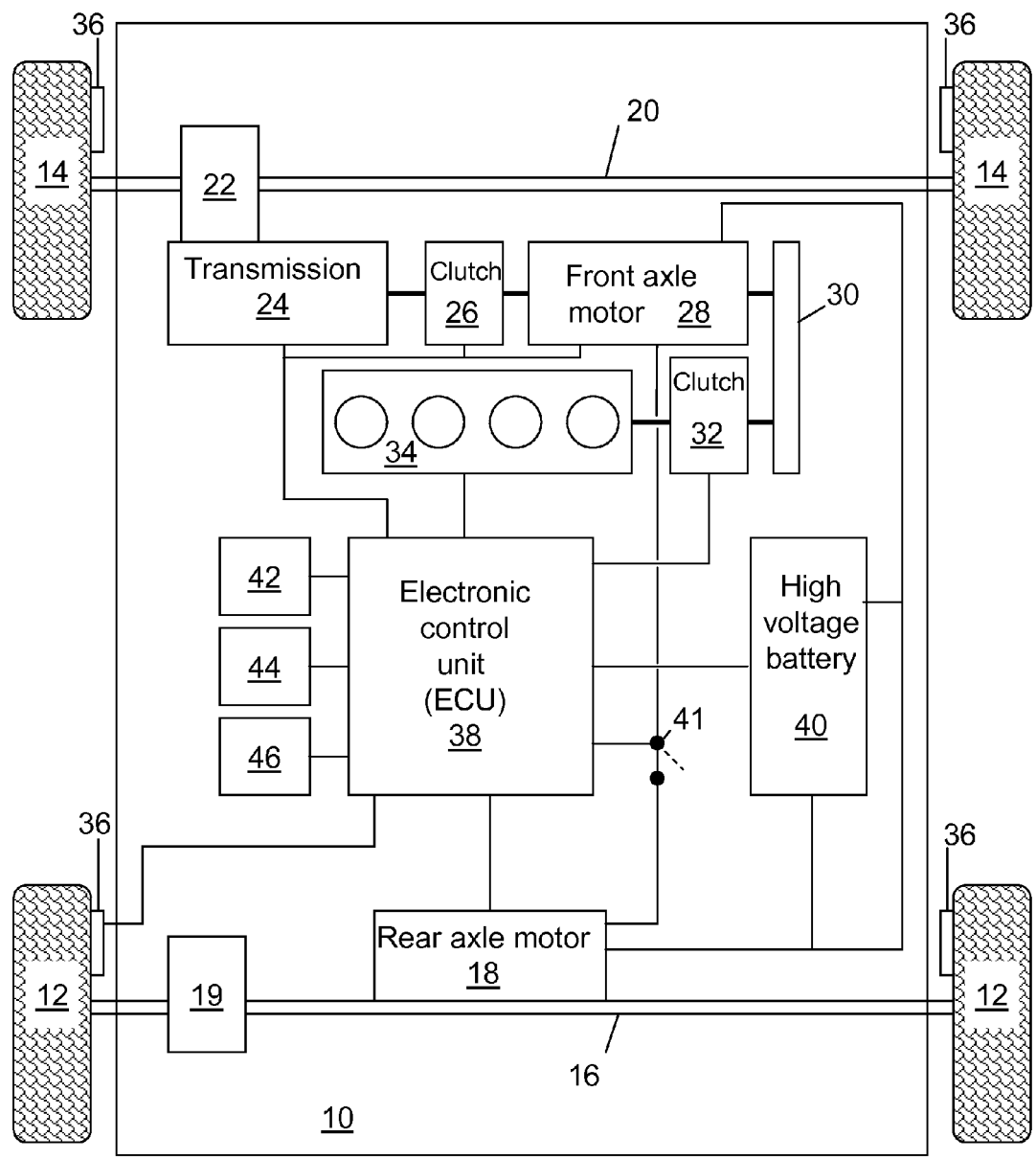
FIG. 1 shows a schematic representation of a hybrid electric vehicle (HEV)

In FIG. 1, one embodiment of a hybrid electric vehicle (HEV) 10 is shown schematically. Rear wheels 12 are coupled via rear axle 16 with a rear axle motor 18. Rear axle 16 has a differential 19. Front wheels 14 are coupled to front axle 20. A differential and final drive gear set 22 are coupled to front axle 20. The vehicle powertrain system is coupled to differential 22 through a transmission 24. Transmission 24 is coupled to a front axle motor 28 via a clutch 28. Front axle motor 28 is coupled to an internal combustion engine 34 via a clutch 32. Front axle motor 28, in the arrangement shown in FIG. 1, can be called an integrated starter generator (ISG) because it can be used to spin up engine 34 for starting purposes. Depending on the exact configuration, it is likely that all of the powertrain components cannot be coupled end to end within the width of HEV 10. In the embodiment shown in FIG. 1, a chain drive 30 is provided between engine 34 and front axle motor 28 such that engine 34 rotates along a first axis and front axle motor 28 and transmission 24 rotate along a second axis substantially parallel to the first axis. The configuration in FIG. 1 illustrates simply one HEV configuration. There are many alternatives for configuring HEV which do not depart from the scope of the present disclosure. HEV 10 shows an arrangement in which internal combustion engine 34 is coupled to the front wheels. In another embodiment, engine 34 is coupled to the rear axle. In yet another embodiment, the vehicle is an electric vehicle, sometimes called a battery-only electric vehicle (BEV). Front and rear axle motors 28 and 18 can operate as motors providing torque to the associated axle or as generators absorbing torque from the associated axle, i.e., providing a braking force on wheels associated with the axle.

Continuing to refer to FIG. 1, wheels 12 and 14 are provided with traction sensors 36, which are coupled to an ECU 38. Traction sensors 36, in one embodiment, are part of an anti-lock braking system (ABS). ABS compares vehicle speed with wheel speed. When the two differ by more than a predetermined amount, the wheel is determined to be spinning. ABS is simply one example; any suitable traction sensor can be used.

A battery 40 is coupled to rear axle motor 18 and front axle motor 28 to provide electrical energy or to absorb electrical, depending on operational mode. Battery 40 may also be electronically coupled to ECU 38 via sensors to monitor state of charge of the battery, battery health, etc. In one embodiment, battery 40 is a high voltage battery to facilitate large power extraction from or storage into the battery. Front axle motor 28 and rear axle motor 18 may be coupled directly via a switch 41 to provide electrical energy generated in one motor to the other. Switch 41 is controlled via ECU 38.

In one embodiment, ECU 38 is coupled to a yaw rate sensor 42, a sensor coupled to a steering wheel 44, and a variety of other sensors 46, such as a vehicle speed sensor, temperature sensors, transmission sensors, pressure sensors, and acceleration sensors. In embodiments without yaw rate sensor 42, yaw rate may be estimated based on signals from other sensors 46.

An HEV is shown in FIG. 1. In an alternative embodiment, the vehicle is an electric vehicle (EV) having a front axle motor and a rear axle motor. In such an embodiment, the following components are no longer included: clutch 26, chain drive 30, clutch 32, and engine 34. In some embodiments, transmission 24 is also not included.

Assume the engine is connected to the front axle and the front axle is the primary driven axle. The engine torque is $T_{eng}$ and the front axle motor torque is $T_{m\_f}$. The total front axle traction torque is $T_{eng}+T_{m\_f}$. Assuming the instantaneous friction capability at the front axle is $F_{fric}$, which limits the front axle torque capacity to $F_{fric} \cdot R_W$, where $R_W$ is the effective wheel radius. In a traction control situation, the driver requested propulsion torque $T_{prop}$ is larger than $F_{fric} \cdot R_W$. The total torque at the front axle is reduced to avoid wheel slipping. As the electric motor coupled to the front axle can react quickly and provide a negative torque to the front axle, the motor torque is determined by $T_{m\_f}=F_{fric} \cdot R_W - T_{eng}$. When $T_{eng} > F_{fric} \cdot R_W$, $T_{m\_f}$ is negative and the front axle motor is serving as a generator with the energy stored in the battery or provided directly to the rear axle motor.

To compensate for the traction loss: $T_{prop}-F_{fric} \cdot R_W$, the propulsion torque is allocated to the free, or lightly loaded, rear axle wheels that have reserve friction. As a result, the new rear axle motor torque will be: $T_{m\_r}^N = T_{m\_r}+(T_{prop}-F_{fric} \cdot R_W)$ where $T_{m\_r}$ is the existing propulsion/braking torque at the rear axle wheels. The new rear axle motor torque is contingent on not exceeding the rear axle wheel friction limit. As a result, available traction from the road is exploited to satisfy the driver's vehicle propulsion request. The energy to provide $T_{m\_r}$ can be provided either from the front axle regenerated electricity or from the battery.

Figure 2:
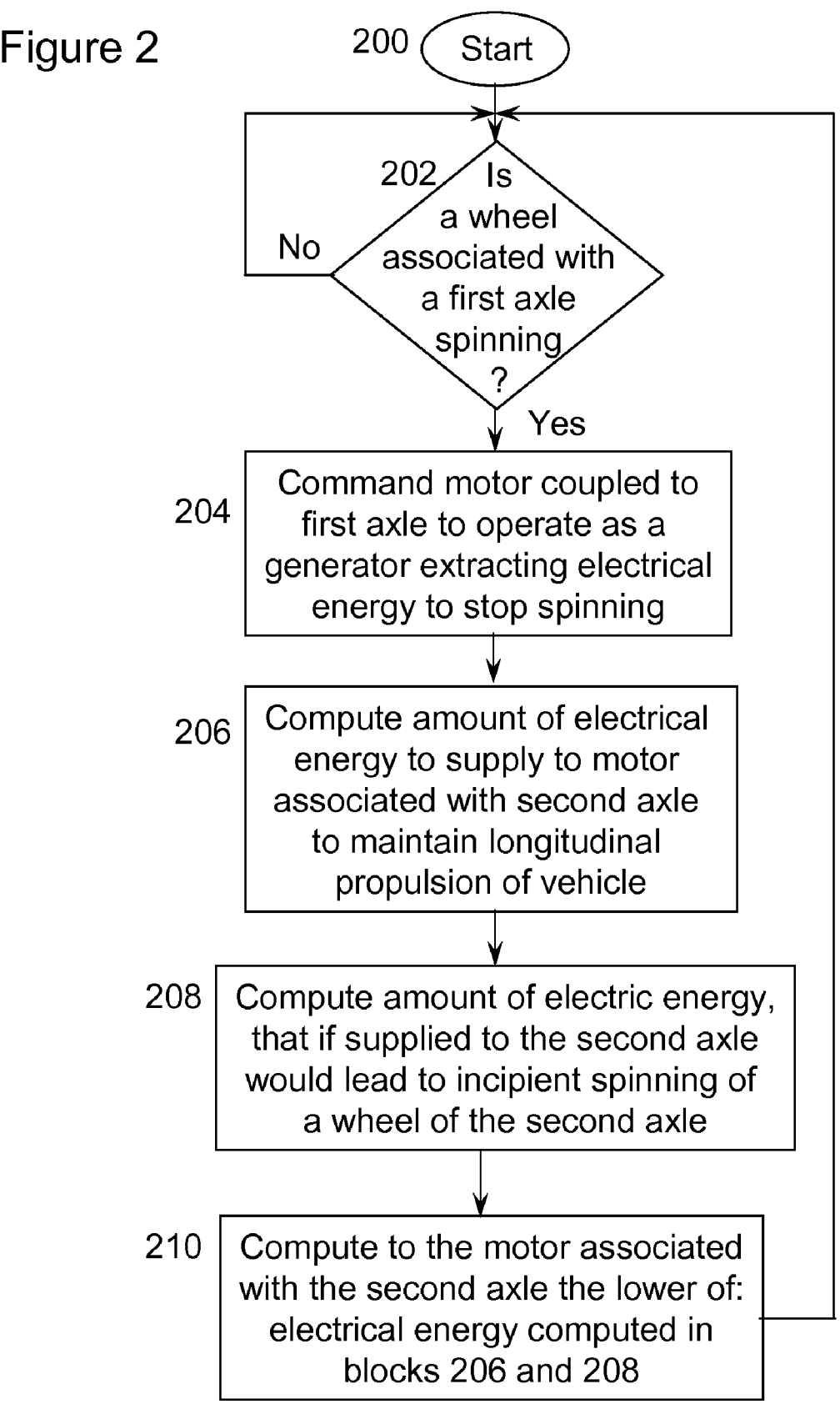
FIG. 2 is a flowchart of a method for redistributing torque between the axles according to an embodiment of the disclosure.

A flowchart, according to an embodiment of the disclosure, is shown in FIG. 2, which starts in 200. In regards to FIG. 2, the axles are referred to as first and second axles. In some embodiments, the first axle corresponds with rear axle 16 of FIG. 1, with second axle corresponding to front axle 20. In other embodiments, the first axle corresponds to front axle 20 and the second axle corresponds to rear axle 16. In block 202 of FIG. 2, it is determined whether a wheel associated with a first axle is spinning. If not, block 202 is continually checked until spinning is occurring to cause control to pass to block 204. In block 204, the motor coupled to the first axle is commanded to reduce torque to the first axle by an amount to stop spinning. The torque is reduced by operating the motor as a generator. Control passes to block 206 in which an amount of torque to supply to the second axle is computed that would maintain the longitudinal propulsion of the vehicle. An amount of electrical energy to provide such torque is determined. Next, in block 208 according to one embodiment, an amount of electrical energy that would lead to incipient spinning of a wheel associated with the second axle is determined. Alternatively, an amount of electrical energy that is a predetermined amount less than that which would lead to incipient spinning is determined to provide a safety factor. In block 210, the lesser of the electrical energy computed in blocks 206 and 208 is commanded to the electric motor associated with the second axle. Control returns to block 202. The flowchart of FIG. 2 is active, in one embodiment, whenever the vehicle is moving, or in another embodiment, whenever longitudinal propulsion is commanded by the operator of the vehicle.

While the best mode has been described in detail, those familiar with the art will recognize various alternative designs and embodiments within the scope of the following claims. Where one or more embodiments have been described as providing advantages or being preferred over other embodiments and/or over background art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. For example, it may be desirable to have an extensive set of sensors to provide an accurate assessment of the vehicle's movement. However, to maintain a desirable cost structure, a satisfactory estimation of some vehicle quantities may be ascertained by inferring from a lesser set of sensor data. The embodiments described as being less desirable relative to other embodiments with respect to one or more characteristics are not outside the scope of the disclosure as claimed.

What is claimed:

1. A method to distribute torque in a vehicle having first and second axles, the method comprising:
   determining whether wheels coupled to the second axle are spinning, wherein:
   commanding a first motor coupled to the first axle to decrease torque supplied to the first axle to substantially prevent wheels coupled to the first axle from spinning; and
   commanding a second motor coupled to the second axle to operate as a motor when at least one wheel coupled to the first axle is spinning, the second motor is commanded to provide an amount of electrical energy substantially equal to the lesser of: an amount which causes incipient spinning of one of the wheels coupled to the second axle and an amount to provide a driver-requested torque to the vehicle.

2. The method of claim 1, further comprising:
   determining a first amount of electrical energy to command to the second motor so that the driver-requested torque is provided to the vehicle;
   determining a second amount of electrical energy to command to the second motor, the second amount of electrical energy being a predetermined amount less than that which leads to at least one wheel of the second axle spinning; and
   commanding the first motor to supply the lesser of the first amount and the second amount of electrical energy to the second axle.

3. A system to distribute propulsion in a vehicle, the system comprising:
   first and second axles coupled to the vehicle;
   a first motor coupled to the first axle;
   a second motor coupled to the second axle;
   wheel speed sensors coupled to vehicle wheels;
   a vehicle speed sensor;
   an electronic control unit (ECU) electronically coupled to motors, the wheel speed sensors, and the vehicle speed sensor, the ECU causing electrical energy to be generated by the first motor in response to the ECU determining that a wheel speed of at least one wheel associated with the first axle exceeds the vehicle speed and causing electrical energy to be supplied to the second motor in response to electrical energy being generated in the first motor.

4. The system of claim 3 wherein the electrical energy generated by the first motor is provided directly to the second motor.

5. The system of claim 3, further comprising:
a battery coupled to the first and second motors wherein the electrical energy provided to the second motor is provided directly from the first motor and supplemented by the battery.

6. The system of claim 3 wherein the wheel speed sensors are part of an anti-lock braking system.

7. The system of claim 3, further comprising: an internal combustion engine coupled to the first axle.

8. A method to distribute propulsion in a vehicle, the method comprising:
monitoring wheel spin for wheels associated with a first axle of the vehicle;
extracting electrical energy from a first motor coupled to the first axle when a first axle wheel is spinning; and
providing electrical energy to a second motor coupled to a second axle of the vehicle in response to the extracting electrical energy from the first motor.

9. A method to distribute propulsion in a vehicle, the method comprising:
monitoring wheel spin for wheels associated with a first axle of the vehicle;
extracting electrical energy from a first motor coupled to the first axle when a first axle wheel is spinning wherein an amount of electrical energy extracted from the first motor is determined based on substantially eliminating spinning of wheels associated with the first axle; and
providing electrical energy to a second motor coupled to a second axle of the vehicle in response to the extracting electrical energy from the first motor.

10. The method of claim 8 wherein the extracting electrical energy from the first motor causes a propulsive force at wheels associated with the first axle to be reduced and the electrical energy provided to the second motor is determined to make up for the reduced propulsive force at the first axle so that a total propulsive force provided to the vehicle is substantially constant.

11. The method of claim 8, further comprising:
monitoring wheel spin for wheels associated with a second, axle of the vehicle wherein the extracting electrical energy from the first motor causes a propulsive force at wheels associated with the first axle to be reduced and the electrical energy provided to the second electric motor is commanded to be the lesser of: make up for the reduced propulsive force at the first axle so that a total propulsive force provided to the vehicle is substantially constant and an amount of electrical energy associated with incipient wheel spin for at least one wheel associated with the second axle of the vehicle.

12. The method of claim 8 wherein the extracting electrical energy continues while it is determined that the wheel spinning would occur if the extracting electrical energy were discontinued.

13. The method of claim 8 wherein at least a portion of the electrical energy extracted from the first motor is directly provided to the second motor.

14. The method of claim 8, further comprising:
discontinuing extracting electrical energy from the first electric motor and providing electrical energy to the second electric motor when wheels associated with the first axle are no longer spinning.

15. The method of claim 8 wherein the vehicle includes an internal combustion engine coupled to the first axle.

16. The method of claim 8, further comprising:
determining an operator request for torque;
monitoring wheel spin for wheels associated with a second axle of the vehicle wherein the extracting electrical energy from the first motor causes torque at wheels associated with the first axle to be reduced and the electrical energy commanded to the second electric motor is the lesser of: make up for the reduced torque at the first axle so that a total torque provided to the vehicle is substantially equal to operator request torque and an amount of electrical energy associated with incipient wheel spin for at least one wheel associated with the second axle.

17. The method of claim 8 wherein an antilock braking system (ABS) is provided at each wheel of the vehicle, the method further comprising:
determining that a wheel of the vehicle is spinning based on a signal from the antilock braking system associated with the wheel.

18. The method of claim 9 wherein the step of extracting electrical energy from the first motor causes a propulsive force at wheels associated with the first axle to be reduced and the electrical energy provided to the second motor is determined to make up for the reduced propulsive force at the first axle so that a total propulsive force provided to the vehicle is substantially constant.

19. The method of claim 9, further comprising:
monitoring wheel spin for wheels associated with a second axle of the vehicle wherein the extracting electrical energy from the first motor causes a propulsive force at wheels associated with the first axle to be reduced and the electrical energy provided to the second electric motor is commanded to be the lesser of: make up for the reduced propulsive force at the first axle so that a total propulsive force provided to the vehicle is substantially constant and an amount of electrical energy associated with incipient wheel spin for at least one wheel associated with the second axle of the vehicle.

20. The method of claim 9 wherein the step of extracting electrical energy continues while it is determined that the wheel spinning would occur if the extracting electrical energy were discontinued.

21. The method of claim 9 wherein at least a portion of the electrical energy extracted from the first motor is directly provided to the second motor.

22. The method of claim 9, further comprising:
discontinuing extracting electrical energy from the first electric motor and providing electrical energy to the second electric motor when wheels associated with the first axle are no longer spinning.

23. The method of claim 9, further comprising:
determining an operator request for torque;
monitoring wheel spin for wheels associated with a second axle Of the vehicle wherein the extracting electrical energy from the first motor causes torque at wheels associated with the first axle to be reduced and the electrical energy commanded to the second electric motor is the lesser of: make up for the reduced torque at the first axle so that a total torque provided to the vehicle is substantially equal to operator request torque and an amount of electrical energy associated with incipient wheel spin for at least one wheel associated with the second axle.

* * * * *